United States Patent Office 3,003,758
Patented Oct. 10, 1961

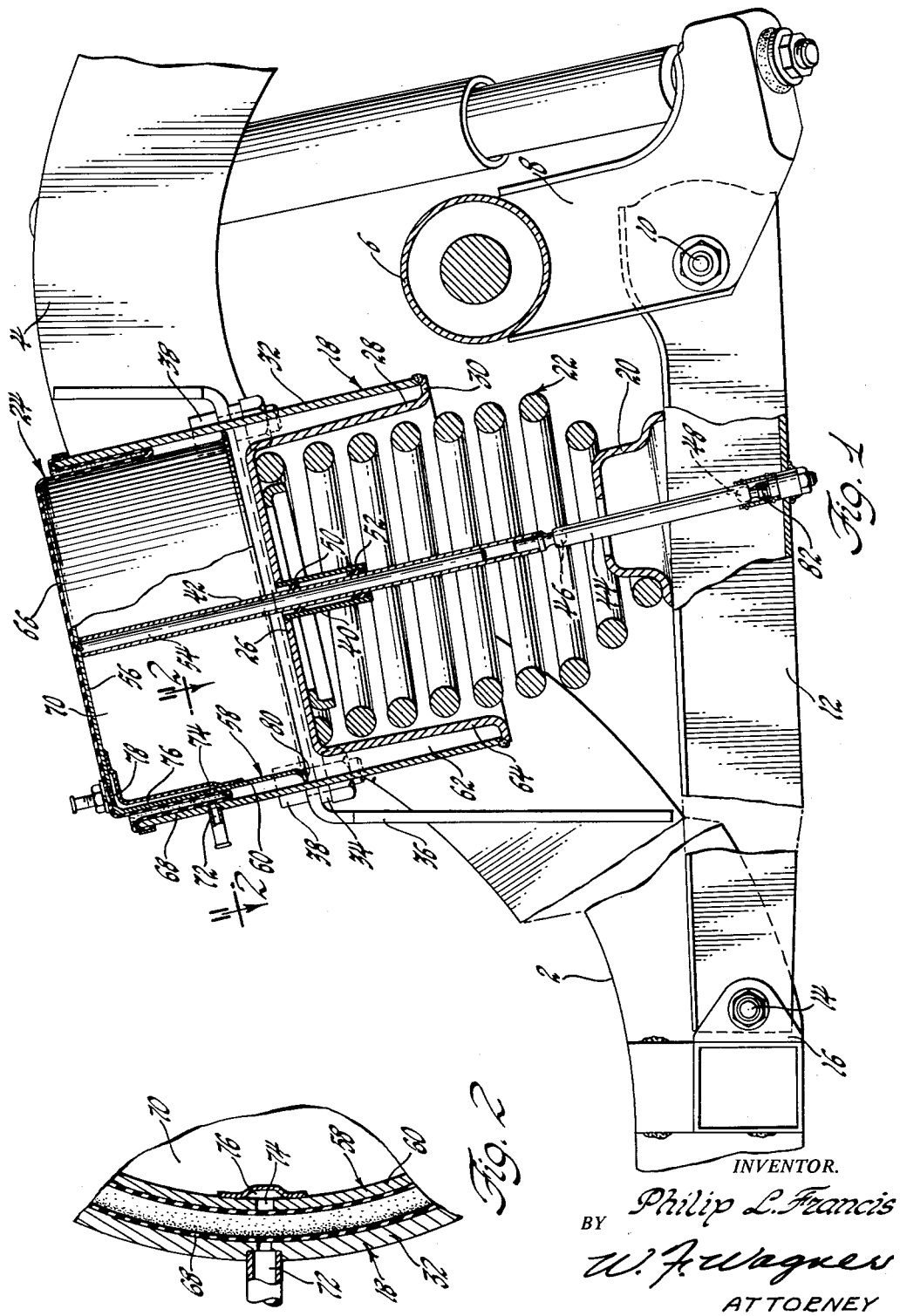

3,003,758
VEHICLE SUSPENSION SELF-LEVELING
COMPOSITE SPRING ASSEMBLY
Philip L. Francis, Pontiac, Mich., assignor to General
Motors Corporation, Detroit, Mich., a corporation of
Delaware
Filed Apr. 4, 1960, Ser. No. 19,537
13 Claims. (Cl. 267—34)

This invention relates to vehicle suspension and more particularly to suspension of the type adapted to maintain the vehicle sprung mass at a predetermined trim height regardless of load imposed thereon.

An object of the present invention is to provide an improved vehicle suspension.

Another object is to provide a vehicle suspension including composite spring means adapted to maintain the sprung mass at a predetermined trim height.

A further object is to provide a self-leveling vehicle suspension incorporating a composite spring assembly of the type wherein a fluid spring and a coil spring are arranged to act in parallel.

A still further object is to provide an arrangement of the stated character wherein the fluid spring and coil spring are disposed in axially adjacent relation.

Yet a further object is to provide a spring assembly of the type described wherein the fluid spring portion is disposed above the coil spring and is so formed and arranged as to allow the coil spring to occupy the entire vertical distance between the sprung and unsprung portions of the vehicle suspension.

Yet another object is to provide an arrangement of the type described wherein the fluid spring portion comprises a piston, diaphragm and cylinder assembly utilizing subatmospheric pressure as the elastic medium, the cylinder and piston of the assembly incorporating ports which are spaced so as to be covered and uncovered by the diaphragm as an incidence of relative displacement of the spring whereby variation in the level of subatmospheric pressure within the spring is an automatic function of increase or decrease in load imposed on the sprung mass.

Still a further object is to provide a spring assembly of the stated character wherein the piston element of the fluid spring portion is capable of rotational freedom relative to the cylinder and axial freedom in one direction relative to the unsprung mass of the vehicle.

Still another object is to provide a spring assembly comprising a coil spring disposed between a lower spring seat on the vehicle unsprung mass and an upper spring seat attached to the vehicle sprung mass, the upper spring seat being in the form of an inverted cup and having secured thereto an upwardly extending cylinder in which is reciprocably disposed an inverted cup-shaped piston of smaller diameter than the cylinder but larger diameter than the upper spring seat, the annular interval between the piston and cylinder being closed by a diaphragm element having an annular depending lobe portion, and the piston being formed with a flared skirt portion closely interfitting the cylinder so as to prevent transient extremes in internal pressure from affecting the volumetric space immediately adjacent the depending lobe portion.

These and other objects, advantages, and features of the invention will become more fully apparent as reference is had to the accompanying specification and drawings wherein:

FIG. 1 is a side elevational view partly in section of a vehicle rear suspension assembly incorporating the invention; and FIG. 2 is an enlarged sectional view looking in the direction of arrows 2—2 of FIG. 1.

In FIG. 1, the reference numeral 2 designates the vehicle frame side rail which includes an upwardly bowed portion 4 which extends over the usual transversely extending axle housing 6 upon which a vehicle driving wheel, not shown, is mounted. Axle 6 has secured thereto a depending bracket 8 which is pivotally connected at 10 to the rear end of a longitudinally extending suspension control arm 12. The forward end of control arm 12 in turn is pivotally connected at 14 to a bracket 16 rigidly secured on frame side rail 2.

To elastically support frame 2 and sprung mass associated therewith (not shown) with respect to wheel supporting axle housing 6 in accordance with the present invention, there is provided a composite spring assembly 18 which extends vertically between frame kick-up or bowed portion 4 and a lower spring seat 20 formed on control arm 12 intermediate the ends thereof. Composite spring assembly 18 includes a coil spring portion 22 and a fluid spring portion 24. The lower end of coil spring 22 engages seat 20 on arm 12 while the upper end thereof engages the upper end wall 26 of an inverted cup-shaped spring seat 28. In the embodiment shown, the lowermost extremity of seat 28 is formed with a radially outwardly extending flange 30 which has affixed thereto, as by welding, a vertically upwardly extending cylinder element 32, the length of which is such that the upper end thereof extends above end wall 26 of spring seat 28 approximately the same distance as the total vertical depth of seat 28. Vertically intermediate thereof, cylinder 32 has rigidly secured thereto a radial flange 34 which is adapted to be connected to an apertured frame mounted bracket 36 by means of circumferentially spaced bolts 38. It will be apparent that when attached in the manner described, the upper wall 26 of seat 28 is maintained in a fixed vertical position relative to frame kick-up 4 and hence coil spring 22 will react between seat 26 and 20 in precisely the same manner as conventional coil spring suspensions.

In accordance with one feature of the invention, the upper wall 26 of seat 28 is formed with a central aperture in which is rigidly secured, as by welding, a vertically extending sleeve 40. Reciprocably disposed in sleeve 40 is a tubular element 42, the lower end of which extends downwardly coaxially of coil spring 22 for connection with control arm 12 by means of a link 44. The upper end of link 44 is articulatably connected to tube 42 by ball and socket connection 46, while the lower end thereof is connected to control arm 12 by ball and socket connection 48. To effect fluid tight sliding engagement between sleeve 40 and tube 42, the former is provided with a pair of vertically spaced circular seals 50 and 52. The upper portion of tube 42 has reciprocably disposed therein depending rod 54, the upper end of which is rigidly connected to the upper end wall 56 of an inverted cup-shaped piston element 58. The depending annular wall 60 of piston 58 is dimensioned so as to permit telescoping thereof into the annular cavity 62 formed between the lower wall of cylinder 32 and the depending wall 64 of spring seat 28.

Extending across the external surface of the upper wall 56 of piston 58 and connected at its outer periphery to the upper end of cylinder 32 is a thin flexible diaphragm element 66. Diaphragm 66 includes an intermediate annular depending lobe portion 68 which extends into the annular interval between piston 58 and cylinder 32 and overlaps the radially adjacent peripheral surfaces thereof under the influence of atmospheric pressure when the closed cavity 70 formed by cylinder 32, diaphragm 66 and seat 28 is subjected to subatmospheric pressure derived from a source of vacuum such as the vehicle engine manifold, not shown. To control the level of subatmospheric pressure in cavity 70, cylinder 32 and piston 58 are provided with ports 72 and 74, respectively, which are located in horizontal alignment when the vehicle sprung mass is at the desired vertical level. Port 72 is connected to the source of vacuum previously mentioned, while port 74 communicates with atmosphere via channel passage 76 and port 78 extending through piston end wall 56. In operation, displacement of piston 58 above and below the piston shown causes alternate uncovering of ports 72 or 74, respectively, by diaphragm 68 and thus automatically regulates the level of subatmospheric pressure in cavity 70 so that the combined rate of the fluid spring and the coil spring maintains the sprung mass at the constant trim height shown. For a complete and detailed description of this automatic leveling operation of fluid spring portion, reference may be had to my copending application Serial No. 813,160, filed May 14, 1959, entitled "Self-Leveling Fluid Spring," assigned to General Motors Corporation.

According to another feature of the invention, the lower extremity of the depending piston wall 60 is flared to form a radially outwardly extending flange 80 which closely interfits with the internal bore of cylinder 32. This feature, together with the axial upward freedom of movement of piston 58 and rod 54 relative to tube 42 overcomes any tendency for the depending lobe portion 68 of the diaphragm to buckle upwardly as a result of transient approaches to atmospheric or superatmospheric pressure within the spring cavity 70 resulting from rebound deflection of the control arm 12. It will be apparent that under such conditions even though arm 12 rebounds to its maximum at high velocity, piston 58 is not required to descend either the same distance or at the same velocity; hence, any tendency for the piston to act as a pump and raise the pressure in cavity 70 to or above atmospheric is overcome. As a result, the diaphragm lobe portion will be maintained in the desired depending convolution overlapping the opposing cylinder and piston walls and assure maintenance of the normal valve function of ports 72 and 74.

According to another feature of the invention, the manner of connecting piston 58 with tube 42 by means of rod 54 permits the piston to rotate freely relative to cylinder 32 and thereby prevent imposition of any turning force on the diaphragm resulting from initial misalignment of components.

As will be apparent from preceding description, tube 42 is required to track vertically in sleeve 40 which is rigidly connected to spring seat 28. Since the latter is secured in a fixed angular position relative to the frame 2, it will be seen that the angular movement of control arm 12 incident to compression and rebound movement necessitates provision for overcoming dissimilar tracking of lower spring seat 20 and tube 42. In the present invention, this is accomplished. In addition, the lower ball joint connection 48 associated with link 44 includes threadable means 82 which permit initial adjustment of the effective length of tube 42 so that the operating range of the vacuum spring may be properly correlated with the operation of the coil spring.

From the foregoing it will be seen that a simplified and improved composite spring assembly has been provided. In addition to the numerous features and advantages previously noted, it will be seen that when constructed in the manner described, the spring assembly may be very easily installed, removed, or repaired. In particular, the coil spring portion may be completely removed and replaced without disturbing any part of the associated vacuum spring. On the other hand, the vacuum spring portion is extremely well protected from exposure either to physical impact of stones, etc., or the corrosive influence of airborne contaminants.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. A composite coil and fluid spring assembly arranged in parallel, said assembly comprising an upper and a lower spring seat for said coil spring, a coil spring disposed between said seats, said upper spring seat including a depending annular portion surrounding the upper part of said coil spring, a cylinder surrounding and connected to said annular portion, said cylinder having an open upper end extending above said spring seat, the periphery of said cylinder and of said annular portion being spaced radially to form an annular interval therebetween, an inverted cup-shaped piston reciprocable in said annular interval, a flexible diaphragm connecting said cylinder and piston, and means formed in the periphery of said cylinder and said piston respectively cooperating with said flexible diaphragm effective to control fluid flow into and out of said spring responsive to variation in displacement relation of said cylinder and casing.

2. A composite coil and fluid spring assembly arranged in parallel, said assembly comprising an upper and a lower spring seat for said coil spring, a coil spring disposed between said seats, said upper spring seat including a depending annular portion surrounding the upper part of said coil spring, a cylinder surrounding and connected to said annular portion, said cylinder having an open upper end extending above said spring seat, the periphery of said cylinder and of said annular portion being spaced radially to form an annular interval therebetween, an inverted cup-shaped piston reciprocable in said annular interval, a flexible diaphragm connecting said cylinder and piston, means formed in the periphery of said cylinder and said piston respectively cooperating with said flexible diaphragm effective to control fluid flow into and out of said spring responsive to variation in displacement relation of said cylinder and casing, and means connecting said piston to said lower spring seat.

3. A composite coil and fluid spring assembly arranged in parallel, said assembly comprising an upper and a lower spring seat for said coil spring, a coil spring disposed between said seats, said upper spring seat including a depending annular portion surrounding the upper part of said coil spring, a cylinder surrounding and connected to said annular portion, said cylinder having an open upper end extending above said spring seat, the periphery of said cylinder and of said annular portion being spaced radially to form an annular interval therebetween, an inverted cup-shaped piston reciprocable in said annular interval, a flexible diaphragm connecting said cylinder and piston, means formed in the periphery of said cylinder and said piston respectively cooperating with said flexible diaphragm effective to control fluid flow into and out of said spring responsive to variation in displacement relation of said cylinder and casing, and thrust means connecting said piston to said lower spring seat.

4. A composite coil and fluid spring assembly arranged in parallel, said assembly comprising an upper and a lower spring seat for said coil spring, a coil spring disposed between said seats, said upper spring seat including a depending annular portion surrounding the upper part of said coil spring, a cylinder surrounding and connected to said annular portion, said cylinder having an open upper end extending above said spring seat, the periphery of said cylinder and of said annular portion being spaced radially to form an annular interval therebetween, an inverted cup-shaped piston reciprocable in said annular interval, a flexible diaphragm connecting said cylinder and piston, means formed in the periphery of said cylinder and said piston respectively cooperating with said flexible diaphragm effective to control fluid flow into and out of said spring responsive to variation in displacement relation of said cylinder and casing, and unidirectional thrust means connecting said piston to said lower spring seat.

5. A composite coil and fluid spring assembly arranged in parallel, said assembly comprising an upper and a lower spring seat for said coil spring, a coil spring disposed between said seats, said upper spring seat including a depending annular portion surrounding the upper part of said coil spring, a cylinder surrounding and connected to said annular portion, said cylinder having an open upper end extending above said spring seat, the periphery of said cylinder and of said annular portion being spaced radially to form an annular interval therebetween, an inverted cup-shaped piston reciprocable in said annular interval, a flexible diaphragm connecting said cylinder and piston, means formed in the periphery of said cylinder and said piston respectively cooperating with said flexible diaphragm effective to control fluid flow into and out of said spring responsive to variation in displacement relation of said cylinder and casing, and unidirectional thrust means extending through said upper spring seat connecting said piston to said lower spring seat.

6. A composite coil and fluid spring assembly arranged in parallel, said assembly comprising an upper and a lower spring seat for said coil spring, a coil spring disposed between said seats, said upper spring seat including a depending annular portion surrounding the upper part of said coil spring, a cylinder surrounding and connected to said annular portion, said cylinder having an open upper end extending above said spring seat, the periphery of said cylinder and of said annular portion being spaced radially to form an annular interval therebetween, an inverted cup-shaped piston reciprocable in said annular interval, a flexible diaphragm connecting said cylinder and piston, means formed in the periphery of said cylinder and said piston respectively cooperating with said flexible diaphragm effective to control fluid flow into and out of said spring responsive to variation in displacement relation of said cylinder and casing, unidirectional thrust means extending through said upper spring seat connecting said piston to said lower spring seat, and means forming a fluid tight sliding connection between said upper spring seat and said thrust means.

7. A composite coil and fluid spring assembly comprising, an upper and a lower spring seat, a coil spring disposed between said seats, said upper spring seat including a depending annular portion surrounding the upper part of said coil spring, said annular portion including a radially outwardly extending flange, a cylinder of larger diameter than said annular portion surrounding the latter and rigidly connected to said flange, said cylinder having an open upper end spaced substantially above said upper spring seat, a piston disposed in said cylinder and reciprocable in the annular interval between said cylinder and annular portion, a flexible diaphragm connecting said cylinder and piston, a telescoping rod connecting said piston with said lower spring seat, and passage means formed in the periphery of said cylinder and said piston respectively cooperating with said flexible diaphragm effective to control fluid flow into and out of said spring, responsive to variation in displacement relation of said cylinder and piston.

8. A composite coil and fluid spring assembly comprising, an upper and a lower spring seat, a coil spring disposed between said seats, said upper spring seat including a depending annular portion surrounding the upper part of said coil spring, said annular portion including a radially outwardly extending flange, a cylinder of larger diameter than said annular portion surrounding the latter and rigidly connected to said flange, said cylinder having an open upper end spaced substantially above said upper spring seat, a piston disposed in said cylinder and reciprocable in the annular interval between said cylinder and annular portion, a flexible diaphragm connecting said cylinder and piston, a telescoping rod connecting said piston with said lower spring seat, and passage means formed in the periphery of said cylinder and said piston respectively cooperating with said flexible diaphragm effective to control fluid flow into and out of said spring, responsive to variation in displacement relation of said cylinder and piston, said piston having a flared skirt closely interfitting said cylinder whereby transient extremes of pressure within said fluid spring are prevented from acting on said diaphragm.

9. A composite coil and fluid spring assembly comprising, an upper and a lower spring seat, a coil spring disposed between said seats, said upper spring seat including a depending annular portion surrounding the upper part of said coil spring, a radially outwardly directed flange on the lower end of said annular portion, a cylinder radially outwardly spaced from and surrounding said annular portion to form a first annular interval therebetween, said cylinder being rigidly connected at its lower end to said flange and having an open upper end spaced substantially above said upper spring seat, an inverted cup-shaped piston disposed in said cylinder and reciprocable in said first annular interval, said piston having a depending skirt spaced radially inwardly from said cylinder to form a second annular interval, said skirt terminating in a radial flange substantially closing said second annular interval, a flexible diaphragm connecting said cylinder and piston, said diaphragm having an intermediate portion extending into the portion of said second annular interval above said piston flange and overlying the adjacent walls of said cylinder and piston skirt, a telescoping thrust transmitting assembly connecting said piston with said lower spring seat, and passage means formed in the periphery of said cylinder and said piston respectively cooperating with said flexible diaphragm effective to control fluid flow into and out of said spring responsive to variation in displacement relation of said cylinder and piston.

10. A composite coil and fluid spring assembly comprising, an upper and a lower spring seat, a coil spring disposed between said seats, said upper spring seat including a depending annular portion surrounding the upper part of said coil spring, a radially outwardly directed flange on the lower end of said annular portion, a cylinder radially outwardly spaced from and surrounding said annular portion to form a first annular interval therebetween, said cylinder being rigidly connected at its lower end to said flange and having an open upper end spaced substantially above said upper spring seat, an inverted cup-shaped piston disposed in said cylinder and reciprocable in said first annular interval, said piston having a depending skirt spaced radially inwardly from said cylinder to form a second annular interval, said skirt terminating in a radial flange substantially closing said second annular interval, a flexible diaphragm connecting said cylinder and piston, said diaphragm having an intermediate portion extending into the portion of said second annular interval above said piston flange and overlying the adjacent walls of said cylinder and piston skirt, a telescoping thrust transmitting assembly connecting said piston with said lower spring seat, said assembly including a tube reciprocably disposed in said upper spring seat and a rod attached to said piston and slidable in said tube, and passage means formed in the periphery of said cylinder and said piston respectively cooperating with said flexible diaphragm effective to control fluid flow into and out of said spring responsive to variation in displacement relation of said cylinder and piston.

11. The structure set forth in claim 6 wherein said last mentioned means comprises a rectilinear guide formed concentric with said upper spring seat.

12. The structure set forth in claim 10 wherein said piston normally abuts said tube.

13. The structure set forth in claim 10 wherein said tube reciprocates in a rectilinear guide in said upper spring seat and is connected to said lower spring seat by an articulated link.

References Cited in the file of this patent
UNITED STATES PATENTS

| | | |
|---|---|---|
| 770,347 | Downer | Sept. 27, 1904 |
| 1,550,081 | Liebau | Aug. 18, 1925 |
| 1,840,178 | Transom | Jan. 5, 1932 |
| 2,257,913 | Maranville | Oct. 7, 1941 |
| 2,551,347 | Stephenson | May 1, 1951 |